(12) United States Patent
Kruger et al.

(10) Patent No.: US 6,738,970 B1
(45) Date of Patent: May 18, 2004

(54) METHOD AND APPARATUS FOR IDENTIFYING CHANGES MADE TO A COMPUTER SYSTEM DUE TO SOFTWARE INSTALLATION

(75) Inventors: Louis P Kruger, Mountain View, CA (US); Anson Mah, Los Gatos, CA (US); Sami Shaio, Palo Alto, CA (US)

(73) Assignee: Marimba, Inc., Mountain View, CA (US)

( * ) Notice: Subject to any disclaimer, the term of this patent is extended or adjusted under 35 U.S.C. 154(b) by 0 days.

(21) Appl. No.: 09/343,979

(22) Filed: Jun. 30, 1999

(51) Int. Cl.[7] .............................................. G06F 9/445
(52) U.S. Cl. ...................... 717/175; 717/169; 717/170; 717/173; 717/178
(58) Field of Search ....................... 707/8–10, 100–102, 707/200–205; 717/122, 169–178

(56) References Cited

U.S. PATENT DOCUMENTS

| | | | |
|---|---|---|---|
| 5,872,979 A | | 2/1999 | Edel et al. |
| 6,038,393 A | * | 3/2000 | Iyengar et al. ................. 717/1 |
| 6,052,531 A | | 4/2000 | Waldin, Jr. et al. |
| 6,131,192 A | * | 10/2000 | Henry .......................... 717/11 |
| 6,167,567 A | | 12/2000 | Chiles et al. |
| 6,199,198 B1 | * | 3/2001 | Graham ........................ 717/4 |
| 6,216,140 B1 | * | 4/2001 | Kramer ....................... 707/511 |
| 6,216,175 B1 | | 4/2001 | Sliger et al. |
| 6,226,652 B1 | * | 5/2001 | Percival et al. ............. 707/203 |
| 6,226,747 B1 | | 5/2001 | Larsson et al. |

OTHER PUBLICATIONS

Dan Mather, "Automated Installation and Updating of Windows–Based Internet Applications AT Jame Madison University", ACM, Proceedings of the 23rd ACM SIGUCCS conference, pp. L 207–209, Oct. 1995.*
Peter H. Feller, *Software Process Support Through Software Configuration Management*, ACM. pp. 58–60. 1990.
Ian Thomas, *Version and Configuration Management on a Software Engineering Database*, ACM. Pp. 23–25. 1989.

* cited by examiner

Primary Examiner—Tuan Dam
Assistant Examiner—Ted T. Vo
(74) Attorney, Agent, or Firm—Innovation Partners; Charles E. Gotlieb

(57) ABSTRACT

A method and apparatus identifies changes made to a computer system caused by the installation of software. The state of the computer system is recorded before the software is installed and, after the software is installed, the recorded state is compared against the state of the computer system. Changes are written into a manifest, which may be combined with any new or changed files and an installation program to produce a package which can be sent to another computer system for installation.

26 Claims, 9 Drawing Sheets

METHOD AND APPARATUS FOR IDENTIFYING CHANGES MADE TO A COMPUTER SYSTEM DUE TO SOFTWARE INSTALLATION

RELATED APPLICATIONS

The subject matter of this application is related to the subject matter of application Ser. No. 09/231,322 entitled, "System and Method for the Distribution of Code and Data" filed on Jan. 13, 1999 by Arthur van Hoff, Jonathan Payne and Sami Shaio which is a continuation of U.S. Pat. No. 5,919,247 entitled, "System and Method for the Distribution of Code and Data", issued on Jul. 6, 1999, and to application Ser. No. 09/345,999, entitled, "METHOD AND APPARATUS FOR PRODUCING INSTRUCTIONS DESCRIBING THE REMOVAL OF UPDATES TO A COMPUTER SYSTEM" filed on Jun. 30, 1999 by Louis Kruger, Sami Shaio and Anson Mah, each having the same assignee as this application and each is incorporated herein by reference in its entirety.

FIELD OF THE INVENTION

The present invention is related to computer software and more specifically to computer software for remotely installing computer software.

BACKGROUND OF THE INVENTION

Some computer software is provided to the consumer on a CD-ROM along with an installer. To install the computer software on a single computer, the installer, such as the conventional InstallShield product commercially available from InstallShield Software Corporation of Schaumburg, Ill., is operated on a computer system, and the installer installs the software from the CD-ROM. The installer may retrieve from the CD-ROM compressed versions of files that make up the computer software, decompress them and copy them into the user's hard drive using an existing or newly created directory specified by the user. In addition to installing new files, the installer may alter certain existing files such as the Windows Registry in a computer system running the conventional Windows 95 operating system commercially available from Microsoft Corporation of Redmond, Wash.

The installer performs these functions not only according to instructions provided by the manufacturer or distributor of the computer software, but also according to instructions provided by the user of the installer. For example, the installer may prompt the user to specify the type of installation. Types of installation may be selected from a typical installation, containing commonly used files, a full installation containing all files, a basic installation containing only a minimum number of files, or specified files or groups of files. Other instructions may be provided to the installer such as the location of a new directory used to contain many of the new files. The installer uses these instructions and other instructions provided by the manufacturer or distributor of the computer software being installed to perform the necessary changes on the user's computer system.

Although installers can work well for installing software on a single computer, conventional installers have not provided capabilities desirable for installation of software on a large number of computer systems. Instead, management software has been developed to allow automated distribution of computer programs to a large number of computer systems. Management software, such as that described in the related applications, allows client management software on client computer systems to connect to a server management software on one or more server computer systems and receive any necessary files and instructions on how to install the files. For example, to install computer software on a wide variety of computer systems, the entire contents of the CD-ROM containing the files and installer described above could be distributed from the server management software to the client management software. The user could install the new computer software as if he was installing it from the CD-ROM.

Although conventional management software can help to install all types of files on a large number of computer systems, it does not provide the level of control that some administrators desire. Many administrators prefer software to be installed over many computer systems in a consistent manner to make supporting that software easier. To install computer software in a consistent manner using the approach described above would require the user to provide the proper instructions to the installer. To allow each user to consistently install the computer software using conventional management software, the user would have to be provided with detailed installation instructions, which are difficult to produce. Even then, user error would likely cause the software to be installed differently from one computer to the next making support more difficult and expensive making support more difficult and expensive.

If it were possible to identify the changes that the proper installation made to one computer system, it would be possible to provide to management software instructions and files for making those same changes on other computer systems. However, such an approach can involve checking thousands of files for differences, some of which are extremely subtle. Thus, such an approach would be time consuming and subject to error.

What is needed is a method and apparatus that can automatically identify changes made to a computer system during the installation of computer software.

SUMMARY OF INVENTION

A method and apparatus records the state of a computer system before installation of software. After the installation of the software, the state of the user's computer system is compared against the recorded state to identify a set of differences. The set of differences is adjusted if necessary, and a manifest of the adjusted differences is produced. Files that were added during the installation are assembled with the manifest. The files and manifest can be transmitted using conventional management software to a remote computer system for installation.

DETAILED DESCRIPTION OF A PREFERRED EMBODIMENT

Figure 1:
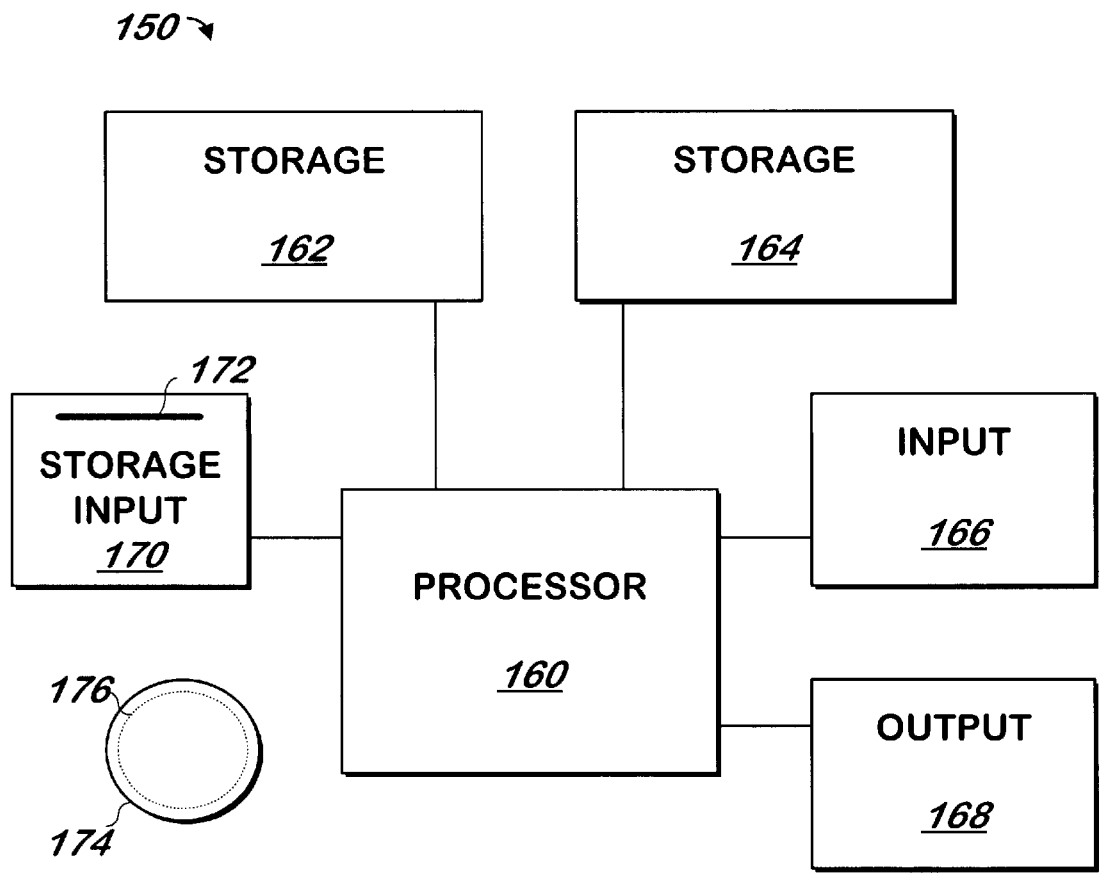
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional IBM compatible computer system commercially available from Dell Computer Corporation of Round Rock, Tex., running the conventional Microsoft Windows operating system, a conventional Ultra Sparc workstation running the conventional Solaris operating system commercially available from Sun Microsystems of Palo Alto, Calif. or a conventional MacIntosh Computer System running the conventional MacOS operating system commercially available from Apple Computer Corporation of Cupertino, Calif. although other systems may be used.

Figure 2:
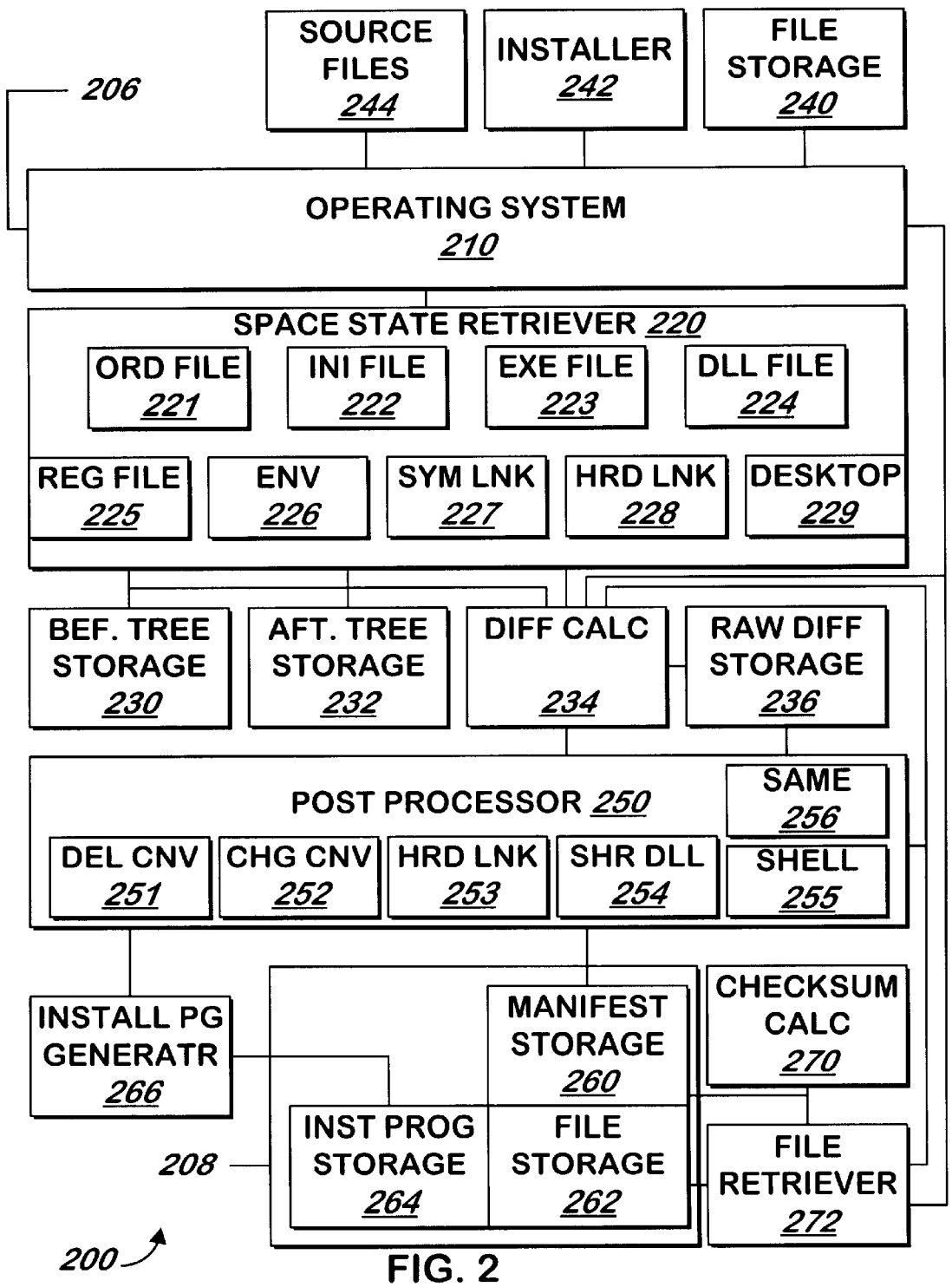
FIG. 2 is a block schematic diagram of a system for identifying changes made to a computer system during the installation of computer software according to one embodiment of the present invention.

Referring now to FIG. 2, a system 200 for identifying changes made to a master computer system during the installation of computer software is shown according to one embodiment of the present invention. The master computer is any computer on which the computer software can be properly installed, and for which such installation will be used as a model for installation of the software on other computer systems.

The system 200 records the state of the master computer system before new computer software is installed, allows installation of the new computer software on the master computer system and then determines the state of the master computer system after the computer software has been installed. The system 200 then determines the changes to the master computer system that were caused by the installation of the computer software and records the differences in a manner that can be used to make those changes on computer systems other than the master. The system 200 then assembles the instructions, the files that were added by the installation of the computer software, and a program. The program can read the instructions, make the indicated changes and install the files. The systems sends the instructions, files and program to other computer systems using conventional management software such as that described in the related applications or the Castanet tuner product commercially available from Marimba, Inc. of Mountain View, Calif. When the program sent is operated, it can install the computer software in a manner consistent with the manner the computer software was installed on the master computer system.

To record the state of the computer system before the computer software is installed, the user uses operating system 210 to signal space state retriever 220 via input/output 206 coupled to a conventional keyboard/mouse/monitor. Operating system 210 is the conventional Microsoft Windows 95, Windows 98 or Windows NT/2000 operating system commercially available from Microsoft corporation of Redmond, Wash., the conventional Unix or Solaris operating system, such as is commercially available Sun Microsystems of Palo Alto, Calif., or the conventional MacOS operating system commercially available from Apple Computer Corporation of Cupertino, Calif., although other operating systems may be used. Space state retriever 220 retrieves the state of different object spaces described in more detail below and builds a tree or other data structure that describes the object spaces as they existed before the installation of the new computer software. In one embodiment, space state retriever 220 records the state of various object spaces into a tree structure, although any set of data may be used. The tree structure is initialized with a root node by space state retriever 220 when signaled by the user.

Space state retriever 220 requests from operating system 210 the names of all of the files in file storage 240. File storage 240 is some or all of the hard drive of the master computer system. Space state retriever 220 receives filenames and other characteristics from operating systems 210 and identifies the type of each file using the file extension or other convention and provides the file and path name and other information provided by the operating system to either ini file state retriever 222, exe file state retriever 223, dll file state retriever 224, or symbolic link state retriever 227 if the name of the file matches the convention for such a file. Files not meeting any convention are considered ordinary files and space state retriever 220 provides the name and path to ordinary files state retriever 221 for such files.

In one embodiment, each of several state retrievers 221–229 capture the state of an object space and add it as a subtree to the root node of the tree built by space state retriever 220. To build the subtree, each of the state retrievers 221–224 and 227–228 that build subtrees corresponding to files provides a level 1 node identifying the subtree as ordinary files, ini files, exe files, dll files, reg files, environment files, hard links or symbolic links. The level 1 node is linked to the root level 0 node built by space state retriever 220 by each state retriever 221–224 and 227–228. Each subtree uses the same hierarchical structure as the file structure, with nodes corresponding to directories existing in a subtree only if the leaf node that belongs in that subtree descends from that directory.

In another embodiment, there is only one subtree for objects corresponding to files, with separate subtrees only for registry nodes and environment nodes. The subtree corresponding to files is built using the same structure as the file structure, with drive designators as the identifiers of level 2 nodes, directories and subdirectories as the identifiers of child nodes of the level 2 nodes.

In both of the preceding embodiments, leaf nodes of the subtree or subtrees correspond to files, and contain information about the files in place of the files themselves. In one embodiment, such information is referred to as the node's properties and contains some or all of the file details that are displayed by the Explorer program of the conventional Windows 95 operating system commercially available from Microsoft Corporation of Redmond, Wash. These details may include the filename, last modification date, size, access permissions such as read only, and security information describing who is allowed access to the file and the type of access allowed. Each state retriever 221–224 and 227–228 adds nodes to the subtree for each file and pathname it receives from space state retriever 220 or otherwise. If one or more folders that are part of the pathname each state retriever 221–224 and 227–228 receives for a file are not in the subtree for that state retriever 221–224 and 227–228, the state retriever 221–224 and 227–228 adds the folders as nodes to the subtree, and each leaf node terminates the branch of the subtree. If desired, state retrievers 221–224 and 227–228 request any additional information they require from operating system 210, and add the information received to the leaf node.

Ordinary files state retriever 221 and exe file state retriever 223 build the subtree for ordinary files and exe files as described above. These state retrievers 221, 223, save the state of the ordinary files and exe files object spaces in each of their respective subtrees. Exe file state retriever 223 additionally requests from operating system 210 the executable version number of each EXE file it receives, and stores this number in the leaf node corresponding to the file.

Another object space describes ".ini" files. These files are used by the operating system or by application programs to initialize certain values and are identified by the extension ".ini" in the filename. Ini file state retriever 222 builds a subtree similar to the subtree built by ordinary file state retriever 221 except that the leaf nodes only correspond to .ini files. Directories and subdirectories correspond to greater-than-level-2 nodes.

The nodes corresponding to the files themselves are built as nodes, though not leaf nodes, by ini file state retriever 222. Although the nodes corresponding to files do contain the same information (name, file size, etc.) as the ordinary files described above, ini file state retriever 222 builds child nodes descending from the file nodes. ini files use sections, with keys and values, and the children of the file nodes are built by ini file state retriever 222 corresponding to the sections of the file, with each key a child node of the file node, and each value as child node of the key node.

DLL file state retriever 224 builds a subtree for dll files similar to the exe subtree described above, and links it into the tree built by space state retriever 220. DLL file state retriever 224 requests from operating system 210 the dll version number and adds it to the properties of the leaf nodes of the tree, similar to the executable version number added by exe state retriever 220.

In one embodiment, symbolic link state retriever 227 uses operating system 210 to investigate the contents of any file whose name it receives from operating system 210. In one embodiment, these files have an extension, "lnk" for the Windows operating system, or are otherwise flagged by the operating system for Unix-related operating systems. If the content of a file is a path and filename of a file, the file contains a symbolic link, if not, symbolic link state retriever 227 passes the information it receives to hard links state retriever 221 for including into the hard links subtree. Such links are used by Unix and Unix variant operating systems. Symbolic link state retriever 227 builds a subtree for all symbolic links it identifies like the ordinary files subtree, but also includes the link as a property. Symbolic link state retriever 227 links the subtree into the tree built by space state retriever 220.

Hard link state retriever 228 builds a subtree similar to that built by symbolic link state retriever 227 described above when it receives information about files from symbolic link state retriever 227. Hard links are also in Unix ".lnk" files, but the contents of those files are numeric, referencing one or more inodes, which are resolved by the operating system 210 to a path and file. Each leaf node also contains the inode number of the hard link as a property. This information is sent to hard link state retriever 228 by symbolic link state retriever 227 when it investigates the link as described above.

In another embodiment, symbolic link state retriever 227 and hard link state retriever 228 are not used. Nodes corresponding to hard and symbolic links are added into the ordinary files subtree by ordinary files state retriever 221 and processed as described below. In one embodiment, ordinary files state retriever 221 flags any ordinary file that has a reference count greater than one as a possible hard link.

When space state retriever 220 has received all of the filenames from operating system 210, it signals some or all of registry file state retriever 225, environment state retriever 226, and desktop state retriever 229. These state retrievers 225–226 and 229 also build subtrees using a level one node identifying the subtree, and link the level one node into the root node of the tree. Each builds a subtree corresponding to an object state as described below.

Registry file state retriever 225 reads the operating system registry file, such as the windows registry file in Microsoft Windows 95, and builds a subtree corresponding to the hierarchy of the registry file. For example, the Windows registry file arranges the keys and values in a hierarchical folder system and this hierarchy is used to build the subtree. Leaf nodes hold the values in the node's properties, and parents of these nodes store the keys in their properties.

Environment state retriever 226 retrieves environment information from the autoexec.bat file or from the registry file and builds a subtree describing the environment. If the environment information is in the registry file, the hierarchy of the registry file that relates to the environment is used as descendant nodes of the level one node using the same arrangement as the registry subtree described above. A similar arrangement is used from the autoexec.bat file, with commands corresponding to level 2 nodes and each parameter of each such command corresponding to leaf nodes of that parent node.

Desktop state retriever 229 retrieves from the Windows desktop folder the tree of information contained therein and builds a subtree corresponding to the Windows desktop tree. The Windows desktop includes shortcuts that are displayed by the operating system 210 at startup. This tree contains a level one node identifying the subtree as the desktop, and higher-than-level-one nodes for any subfolders, using the same hierarchy as the desktop folder. Leaf nodes correspond to the shortcuts, and contain the properties and attributes of each shortcut. Desktop state retriever 229 inserts the subtree into the tree built by space state retriever 220. In one embodiment, ordinary files state retriever 221 performs these functions and desktop state retriever 229 is not required.

To review, the user signals space state retriever 220 using operating system via input/output 226. Space state retriever 220 builds the tree described above, and signals state retrievers 221–229 as described above. State retrievers 221–229 retrieve the state of the various spaces as described above and complete the tree initialized by space state retriever 220. Space state retriever 220 stores the completed tree into before tree storage 230. The tree stored in before tree storage 230 is a tree that corresponds to the state of the various object space states before the user installs the computer software onto his computer system. This tree is referred to as the "before tree."

Space state retriever 220 signals the user to install the computer software onto his computer system using operating system 210 and input/output 206. To install the software, the user may use installer 242 which is a conventional installer such as the one described above. Source file storage 244 is a conventional storage system such as a conventional software installation CD-ROM in a conventional CD-ROM drive. The source files on the CD-ROM in source file storage 244 contain not only the files that will be decompressed and installed on the user's computer system, but may also contain instructions to the installer 242 describing certain details of how to perform the installation. Installer 242 decompresses and copies some or all of the files of source files 244 to file storage 240 using operating system 210, the instructions it reads from source files 244 and instructions received from the user via input/output 206 and operating system 210 in response to prompts it provides to the user.

In one embodiment, the user then instructs space state retriever 220 using input/output 210 to compare the state of the master computer system with the state recorded in the before tree stored in before tree storage 230.

In one embodiment, space state retriever 220 builds a second tree like the before tree as described above, and stores the second tree into after tree storage 232, which is any conventional storage such as memory or disk. Space state retriever 220 builds the tree as described above, but this time the tree will correspond to the state of the master computer files after the installation of the computer program. Space state retriever 220 then signals difference calculator 234 described in more detail below. Difference calculator 234 compares the tree stored in before tree storage 230 with the tree stored in after tree storage 232 to determine which changes have taken place to the master computer.

In another embodiment, the tree that would otherwise be built and stored in after tree storage 232 is not stored all at once. Instead one or more nodes are built, used to determine the difference between the state of the user's system before the new software is installed and the state after the new software is installed, and then the one or more nodes that would otherwise have made up the tree stored in after tree storage 232 are discarded. This embodiment may be used to reduce the storage requirements for implementing the present invention, and is described in more detail below.

In one embodiment, each of the state retrievers 221–228 uses a consistent order when building the tree that is stored in before tree storage 230 and the tree stored in after tree storage 232 or the nodes that are built, used and discarded as described above. This can allow for more efficient comparison of each subtree as described in more detail below.

In the embodiment in which both trees are stored at the same time, difference calculator 234 selects a level 2 node from the before tree stored in before tree storage 230 and the corresponding level 2 node in the tree stored in after tree storage 232 (referred to herein as the "after tree") and builds a table for each of the two nodes corresponding to all children of that node. The table contains rows, with each row in the table corresponding to siblings of the node selected. The filename or key/value name is located in a "name" column of the row. Any properties of that node are also contained in property columns of the row.

Difference calculator 234 compares the first entry in the table corresponding to the before tree with the first entry in the table corresponding to after tree. If the name column of these two entries match, difference calculator 234 generates two tables, one table for each of their child nodes, if any, and uses recursion to compare a row in each of the child node tables as described herein. The name of each node matches if its filename matches for nodes corresponding to files. Entries corresponding to keys or values match if the key name matches or value matches.

When difference calculator 234 compares a terminal node, the properties of the node are also compared, and if the properties of each corresponding node are the same, difference calculator 234 marks the terminal node in the tree it creates as the "same". This means the state represented by the terminal node did not change when the new software was installed. When difference calculator compares table entries corresponding to all child nodes of a node, if all child nodes are the same and the properties of the node are the same as the matching row located in the other table, the parent node of those child nodes is marked as the "same" by difference calculator 234 in the tree it builds. Difference calculator 234 then discards the tables corresponding to each of the child nodes, and the recursion performed by difference calculator 234 continues at the sibling node of this parent node If the properties in the table corresponding to a terminal node of the before table are different from the corresponding table entry of the after node but have the same filename (for file terminal nodes) or same parent key (for value nodes), difference calculator marks the node as changed. All nodes in the tree built by difference calculator 234 from which the changed node descended are also marked as changed by difference calculator 234.

If a table entry appears in the table corresponding to the before tree and not corresponding to the after tree, difference calculator 234 adds a node in the tree it builds, marks that node as "deleted", and marks all nodes in the tree it builds from which the deleted node descended as "changed" or "deleted" depending on whether the parent node was already in the tree it builds. If a table entry appears in the table corresponding to the after tree but does not appear in the table corresponding to the before tree, difference calculator 234 adds the node into the tree it builds using the same lineage as the after tree, marks the node as "added" and marks all nodes from which the new node descended as "changed". Descendants of the added nodes are also added to the same tree and marked as added by difference calculator 234. In one embodiment, difference calculator 234 does not build a node in the supertree corresponding to nodes that are located in both the table corresponding to the before tree and the table corresponding to the after tree if all of the properties are identical in both tables if such rows correspond to leaf nodes. In another embodiment, difference calculator 234 does build such nodes, and marks the node as "same", but such nodes are pruned by post processor 250 if the node is a leaf node, or if all of the descendant nodes of a non-leaf node marked "same" are also marked as same, as described in more detail below.

Difference calculator 234 builds a "supertree" that contains some or all of the nodes from the before tree and any new node of the after tree. In addition, the properties for each node that is in the after tree are provided as properties of those nodes in the supertree. Properties of nodes in the before tree but not in the after tree are copied from the before tree to the supertree by difference calculator 234. Difference calculator 236 stores the supertree in raw diff storage 236, which may be memory or disk.

As difference calculator 234 completes the processing described above of all siblings, it discards the table corresponding to those siblings to conserve storage. Before discarding the table, any rows in the before table that are not in the after table may be marked as "deleted" or "added" as described above.

It is possible to conserve memory using alternative embodiments. In such embodiments, parts of either or both trees are built as needed and discarded when no longer needed. The parts may be as small as a node or as large as a subtree. The part may include a single leaf node and all nodes from which that node descends. Alternately, the entire tree may be built and stored on disk in a file. The portions of the file needed can be read from the disk file into memory as needed, then discarded from memory but remain on the disk.

In one embodiment, the after tree is built as needed. In such embodiment, the user signals space state retriever 220 via operating system 210 and input/output 206 to build the before tree as described above. Space state retriever 220 builds the before tree and stores it into before tree storage 230 as described above and then instructs the user via operating system 220 and input/output 206 to install the new software as described above. The user signals difference calculator 234 via input/output 206 and operating system 210. Difference calculator 234 signals space state retriever 234.

Space state retriever 220 provides to difference calculator 234 a node that would have been the first level one node of the tree, and also provides the level of that node, in this case '1'. This node is referred to as the "after node". Each after node is generated by space state retriever 220 one node at a time as requested by difference calculator 234 except as noted below. Difference calculator 234 attempts to locate the node in the before tree as a level one node.

If the node matches, difference calculator 234 builds and stores in raw diff storage 236 a node of the supertree and marks it as "same". As described above, such nodes might not be stored or might be pruned later. If the node is not located in the before tree, the node is copied from the after tree inserted into the supertree and marked as "new" as described above. If the node is located as described above, but has a different property, difference calculator 234 builds the node in the supertree from the after node and marks it as "changed" as described above.

Difference calculator 234 then requests from space state retriever 220 the next node in what would have been the after tree. The next node is the descendant node of the previous node, if such a node exists. If no descendant node exists for the previous node, the sibling node of the previous node is the next node returned by space state retriever 220 if such a node exists. If no such node exists, the next node is the parent node of the previous node returned by space state retriever 220. When there are no additional nodes in the after tree, a null node is returned. A null node may be indicated using a level of –1 or other flag.

Difference calculator 234 can determine where in the after tree the node returned by space state retriever would have been based on the level number returned by space state retriever 220. If the level number is higher than the level number of the node previously returned by space state retriever 220, the current node is a descendant of that prior node. If the number is the same as the prior node, the current node is a sibling of the prior node. If the level number is lower than the level number of the prior node, the current node is sibling of a parent of the previous node. If a null node is returned, the operation is complete.

In one embodiment, when the level is decreased from the prior node after a request by difference calculator 234 to space state retriever 220, this indicates that there are no more descendant nodes of the prior node in what would have been the after tree. Difference calculator 234 identifies any descendant nodes of the corresponding node in the before tree stored in before tree storage 230 and builds corresponding nodes in the supertree. These nodes are marked as "deleted" in the supertree. Descendant nodes of the deleted nodes are also copied to the supertree and marked as deleted by difference calculator 234.

In another embodiment, when difference calculator signals space state retriever 220, space state retriever 220 retrieves not just the next node, but all sibling nodes of the next node. Difference calculator 234 can then build the after table using these nodes. When difference calculator 234 builds the table using these nodes and builds the before table as described above, it sorts the rows in each table alphabetically by name, although any order may be used as long as the order is the same for both tables. Rows are selected from the after table in alphabetical order beginning with the first row in the table. To locate a row in the before table, the row following the last row processed (that is, either located or used to add a node to the supertree) in the before table is used as a starting point and the search proceeds down the before table among rows not already processed. If no rows have been processed in the before table, the first row in the before table is used as a starting point.

If the starting point row in the before table does not match the name of the selected row in the after table and the name of the selected row in the after table is alphabetically prior to the name of that row in the before table, the row in the after table is assumed to be added, and can be processed as an added node as described above. If that row in the before table does not match the name of the selected row in the after table and the name of the row in the after table is alphabetically after the name of that row in the before table, the row in the after table is assumed to be deleted, and can be processed as a deleted node as described above. When no further rows exist in the after table, nodes not processed in the before table are processed as deleted nodes as described above.

As space state retriever 220 receives requests from difference calculator 234, space state retriever 220 retrieves the next filename and other characteristics and signals the appropriate retriever 221–229 to build the appropriate node as described above. Space state retriever 220 provides this node to difference calculator 234. When difference calculator 220 completes the comparison and adds any nodes to the supertree, the node received from space state retriever 220 is discarded by difference calculator 234.

In one embodiment, some of the subtrees do not lend themselves to difference calculation one node at a time as described above. In such embodiment, space state retriever 220 generates the entire subtree in place of the first node of that subtree and places that subtree in after tree storage 232. Space state retriever 220 signals difference calculator 234 which processes that subtree using the other embodiment as described above. In one embodiment, the ini subtree is processed in this manner, although other subtrees may also be processed in this manner. After that subtree is processed, processing resumes using the node-at-a-time approach.

When difference calculator 234 completes the supertree as described above, difference calculator 234 signals post processor 250. Post processor 250 reads the supertree stored in raw diff storage 236 as described below and adjusts it or copies it as described herein to produce a manifest. In one embodiment, post processor 250 creates the manifest as it processes the supertree in raw diff storage 236 and stores the manifest in manifest storage 260, which is an area of memory or disk. In another embodiment, post processor 250 adjusts the supertree in raw diff storage 236 and then copies the manifest to manifest storage 260. In another embodiment, the manifest need not be copied, and manifest storage 260 and raw diff storage 236 are the same.

To process the supertree, post processor 250 reads each node of the supertree and passes it to delete converter 251, change converter 252, hard link converter 253, shared DLL converter 254, shell folder converter 255, and same node pruner 256 for processing as each described below.

In one embodiment, delete converter 251 selects all nodes in the supertree that are marked as deleted and substitutes the indication that each such node has been deleted with an indication that the node is the same. This may be because install programs are not supposed to delete things, and thus deleted nodes are seen as erroneous. Thus, even if a file is deleted on the user's system during the installation, the apparatus of the present invention will ignore such a deletion when producing the set of instructions that describe how to replicate the installation of the software on other systems. Change converter 252 selects nodes in the supertree that are marked as changed, and marks them as added instead.

Hard link converter 253 adjusts hard links as described below with reference to FIG. 9A. When post processor 250 has otherwise completed its processing, if operating system 210 is Unix or a variant of Unix, post processor 250 signals hard link converter 253, which scans each node in the tree and changes certain nodes as described below with respect to FIG. 9B.

In one embodiment, when space state retriever 220 builds a node corresponding to a file, it obtains from operating system 210 the reference count for the file. Difference calculator 234 calculates and places in the supertree the difference between the reference count in the after tree and the reference count in the before tree for all nodes marked the same or changed, and zero for all other nodes. Shared DLL processor 254 uses the difference to determine if the reference count has been altered by the installation. If the difference is greater than one, the node in the supertree is marked as "add". If some or all of the nodes of the supertree that would have been marked as "same" have been removed from the tree, shared DLL processor 254 can obtain via operating system 210 the reference counts for each file in the computer system. Shared DLL processor 254 can, for each file, compare the reference count obtained with the reference count stored for the file in the before tree. If the reference count obtained for the file is higher than the reference count for that file in the before tree, shared DLL processor 254 adds to the supertree a node corresponding to the file, and marks the node as "add".

In one embodiment, some properties of nodes in the supertree describe certain folders. These folders may have different names or locations from one computer to the next. These folders describe (e.g. using a pathname) the location of certain entities such as the Desktop, the windows directory and the system directory. Shell processor 236 retrieves from the registry table and from API calls made to the operating system the location of each entity when it is first called by post processor 250 and creates an alias for each such location. If shell processor 255 identifies any of these locations in the properties of any nodes it receives, shell processor 255 replaces the reference with the alias. For example, if the location of the windows directory is at c:\windows, shell processor searches for "c:\windows" in all nodes of the supertree. Shell processor replaces "c:\windows" with the alias $windows. This allows the program that will perform the installation on a subsequent machine to adjust the location to match the corresponding location on the subsequent machine. Aliases are generated for the desktop, the windows directory and the system directory if the operating system 210 is Windows 95, other similar aliases may be generated for other operating systems and for other embodiments of the present invention. As entries are located in the registry table, aliases are generated.

Same node pruner 256 removes from the supertree all nodes marked as "same" because the objects corresponding to these nodes will not need to be altered during subsequent installations.

After post processor 250 has completed its operation, the resulting tree is referred to as manifest. Post processor 260 places the manifest in manifest storage 260. The manifest tells an installation program on any subsequent machine how to make the changes that will perform the installation on the subsequent machine. Manifest storage 260 is any conventional storage such as memory or disk. When post processor 250 has completed the operations described above, post processor 250 signals file retriever 272 and install program generator 266.

File retriever 272 reads the names and paths of ordinary files, ini files, exe files and dll files subtrees that are marked as added in the manifest and copies the actual files to file storage 262 from file storage 240 via operating system 210. As the files are received by file retriever 272, they are passed to checksum calculator 270. Checksum calculator 270 uses a conventional hash algorithm such as the conventional MD5 checksum described in Schneier, Applied Cryptography, (2d ed. 1996 John Wiley & Sons, ISBN 0-471-11709-9), incorporated herein by reference, to produce two hash results: a hash result of the file, and a hash result of the filename and path of the file. The hash result of the filename and path is returned to file retriever 272, which uses that hash result to name the file in file storage 262. File retriever 272 appends the hash result to the properties of the corresponding node in the manifest. This allows file storage 262 to be organized as a non-hierarchical storage area. The filenames can be restored back to their original names on the destination computer using the manifest stored in manifest storage 260.

If desired, install program generator 266 is also signaled by post processor 250 after post processing operations as described above. Install program generator 266 copies an installation program to install program storage 264 that can read the manifest in manifest storage 260 and make the changes indicated. This allows the contents of manifest storage 260, file storage 262 and install program storage 264 to be provided by operating system 210 coupled to output 208 (via a connection not shown) to management software for transmission to another computer system as a complete package.

Figure 3:
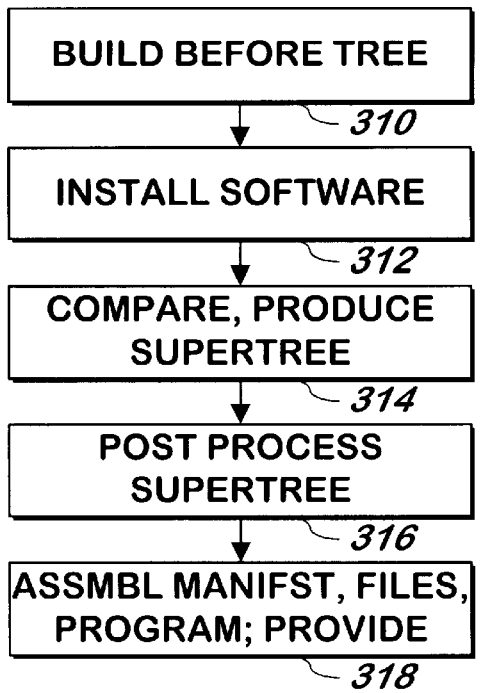
FIG. 3 is a flowchart illustrating a method of identifying changes made to a computer system resulting from software installation according to one embodiment of the present invention.

Referring now to FIG. 3, a method of identifying changes made to a computer system resulting from software installation is shown according to one embodiment of the present invention. A "before" tree is built 310 describing the state of various object spaces of the user's computer system before installation of the software as described above with reference to FIG. 2 and below with reference to FIG. 4. The software is installed 312 and the before tree built in step 310 and the state of various object spaces of the user's computer system after the installation of the software are compared 314 to produce a supertree, using either of the two methods described above with reference to FIG. 2 or either of the methods of FIGS. 5 and 6. The supertree is processed 316 as described above with reference to FIG. 2 and below with reference to FIG. 7 to produce a manifest. The manifest, the files that are new or changed, and a program are assembled and provided 318 to another computer system. The other computer system can run the program, which can use the manifest and the files to reproduce on the first computer system the changes made to the master computer system that were due to the installation of the software.

Figure 4:
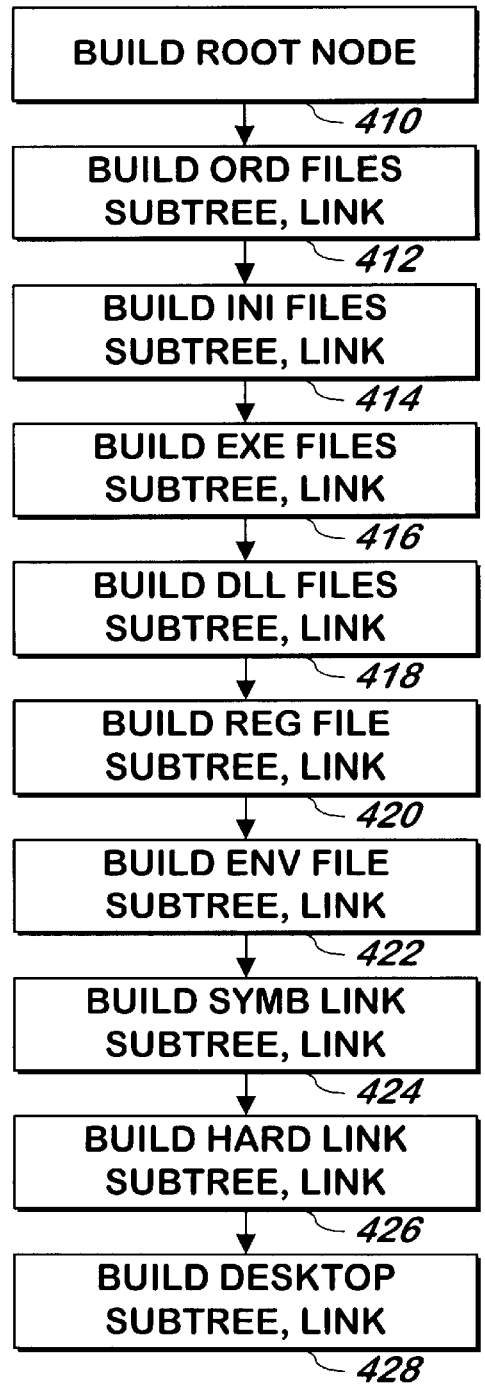
FIG. 4 is a flowchart illustrating a method of building a tree according to one embodiment of the present invention.

Referring now to FIG. 4, a method of building a tree is shown according to one embodiment of the present invention. The method illustrated in FIG. 4 may be used to build the before tree described in step 310 of FIG. 3 and may be used to build the after tree of step 508 of FIG. 5 described below.

A root node is built 410 as described above. A subtree corresponding to the object state of ordinary files is built and linked 412 to the root node as described above. A subtree corresponding to the object state of ini files or similar files is built and linked 414 to the root node as described above. A subtree corresponding to the object state of exe files or similar files is built and linked 416 to the root node as described above. A subtree corresponding to the object state of dll files or similar files is built and linked 418 to the root node as described above. A subtree corresponding to the object state of the registry file or files or a similar file or files is built and linked 420 to the root node as described above. A subtree corresponding to the object state of environment files or similar files is built and linked 422 to the root node as described above. A subtree corresponding to the object state of symbolic links or similar links is built and linked 424 to the root node as described above. A subtree corresponding to the object state of hard links or similar links is built and linked 426 to the root node as described above. A subtree corresponding to the object state of a desktop file or files or a similar file or files is built and linked 428 to the root node as described above.

In one embodiment all of the steps of FIG. 4 are performed, and in another embodiment, some of these steps are omitted based on the operating system. For example, if the operating system is the conventional Windows 95 operating system, steps 424 and 426 may be omitted.

As described above, steps 412–418 and 422–426 may be performed at once, with all nodes containing the name and properties for these files placed in a single ordinary files subtree.

The order in which the above steps 410–428 are performed may be changed. However; embodiments using an after tree may operate more efficiently if the order of steps 410–428 is the same as was used to build the before tree.

In one embodiment, some of the subtrees are built 412, 414, 416, 418, 424, 426 by requesting the names and other properties of all of the files stored on a master computer, investigating the extensions and adding one or more nodes to the appropriate subtree based on the extension of the filename, and in the case of links, investigating the contents of the file as described above. Also as described above, additional properties of the file may be requested and added to a node of the subtree.

Figure 5:
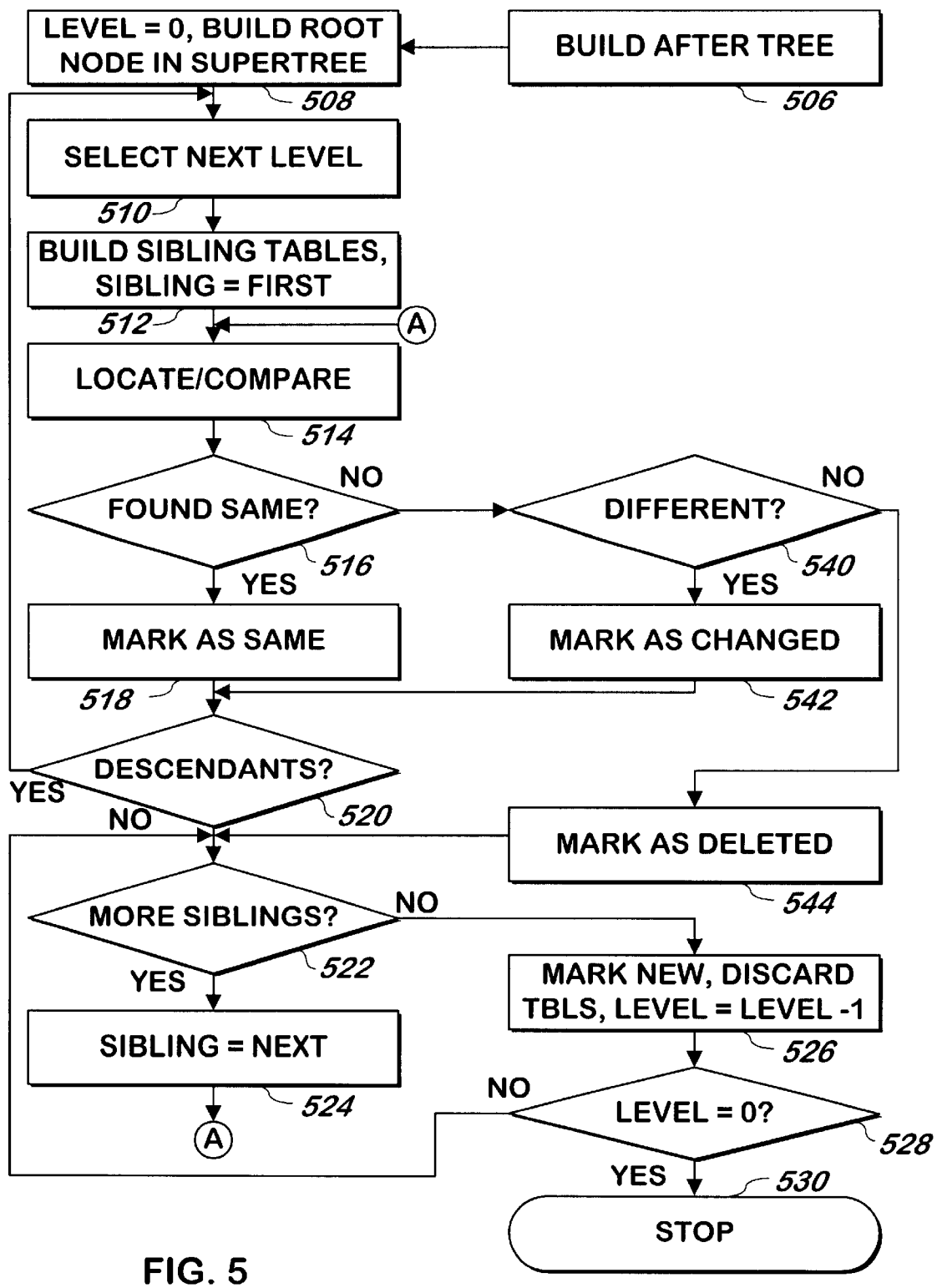
FIG. 5 is a flowchart illustrating a method of comparing the state of a computer before software is installed with the state of a computer after software is installed according to one embodiment of the present invention.

Referring now to FIG. 5, a method of comparing the state of a computer before software is installed with the state of a computer after software is installed is shown according to one embodiment of the present invention. An "after" tree is built 506 as described above with reference to FIGS. 2 and/or 4. A level placeholder is set equal to zero and a root node is built 508 in a supertree as described above. The method of FIG. 5 uses the before table as the reference table and compares it with the after table, although the opposite approach may be used under the same principles.

The next level is selected 510 as described above and two sibling tables are built 512, with one table corresponding to the before tree describing all siblings descending from the previous level, and one table corresponding to the after tree describing all the siblings descending from the previous level. The first sibling in the table is selected 512. The selected sibling from the table corresponding to the before tree is located 514 in the corresponding table in the "after" tree as described above, for example by comparing the name and property of the selected sibling with the name and property of the rows corresponding to the after table.

If the name of the selected sibling matches a name of a row in the table corresponding to the after tree, and if any properties of the selected sibling match the properties of the matching row, 516 the same node is found both before and after the installation of the software, and the node is marked as "same" 518 by building a node in the supertree at the same level, having the same name and other properties as the sibling row and adding an indicator corresponding to "same" in this newly added node.

If there are descendants of the node 520, the level of the descendants is selected 510 and the method continues recursively at step 512. Continuing recursively means the former tables corresponding to the prior level are not deleted when the tables are built in step 514 and the sibling placeholder for each table is maintained even when the next table is built for descendants of a node corresponding to a row in the prior table.

If there are no descendants of the node 520, if there are additional siblings in the table 522 corresponding to the current level that have not been compared in step 514, the next sibling row in the table corresponding to the before tree is selected 524, for example by updating a sibling placeholder to point to the next row in the table corresponding to the before tree, and the method continues at step 514 using that sibling.

If there are no more siblings in the table corresponding to the before tree at step 522, any rows are identified in the table corresponding to the after tree that were not located in step 514 causing a node in the supertree to be generated that was either marked as same as described above or marked as changed as described below. A node corresponding to each such sibling is generated in the supertree and marked as an added node. The properties from any such sibling row are copied into the corresponding node of the supertree.

Nodes descending in the after tree from any added node may be added as part of step 526. The tables from the before tree and the after tree are then discarded, the level is decremented 526, ending one level of recursion. If there are a pair of tables from a prior recursion at that level 528, the method continues at step 522. If the level equals zero, 528, the method terminates 530.

If at step 516, the row for the current sibling in the table corresponding to the before tree is not found and the same as a row of the corresponding table of the after tree 516, then either a row for the current sibling exists in both tables but each has different properties, or the row exists in the table corresponding to the before tree but not in the table corresponding to the after tree. If the row exists in both tables with different properties 540, the row is marked as "changed" 542 by copying the information from the row in the table corresponding to the after tree into a new node in the supertree (in the same relative position as the current sibling node in the before table) and inserting into that new node an identifier that identifies that the node has been changed, and the method continues at step 520. Otherwise, the node is inserted into the supertree by copying its name and properties from the node in the before tree into the same relative position in the supertree, and inserting into the new node an indicator that the node has been deleted. The method continues at step 522.

As described above, the rows in the tables can be sorted using the name order or other order, and nodes may be identified for marking as added or deleted based on the order of the nodes and the sort order of the selected row and either the row following the last processed row or the first row in the table of rows to be located if no row has been processed in that table.

Figure 6:
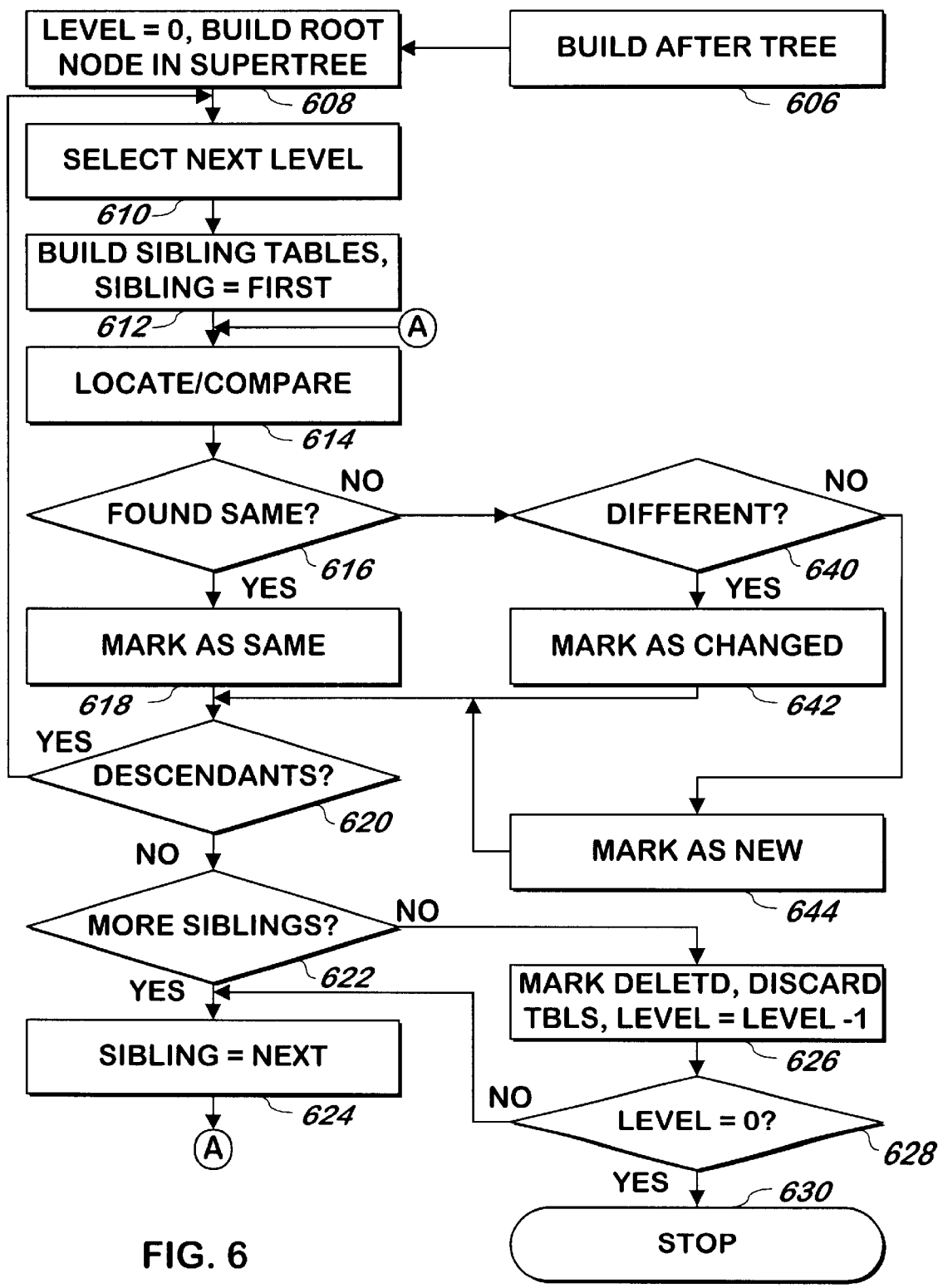
FIG. 6 is a flowchart illustrating a method of comparing the state of a computer before software is installed with the state of a computer after software is installed according to an alternate embodiment of the present invention.

In another embodiment, instead of selecting a sibling from the table corresponding to the before tree and attempting to locate and match it with siblings from the table corresponding to the after tree, a sibling may be selected from the table corresponding to the after tree and the method attempts to locate the sibling in the table corresponding to the before tree. Referring now to FIG. 6, a method of comparing the state of a computer before software is installed with the state of a computer after software is installed is shown according to an alternate embodiment of the present invention. All steps 6XX operate as described above with respect to steps 5XX, with the following exceptions:

1. the roles of the before tree and after tree, and the corresponding tables, are reversed;
2. Step 644 marks nodes that are not found the same 616 and not different 640 as new, and the method continues at step 620; and
3. Step 626 marks the leftover nodes from the table corresponding to the before tree as deleted. Nodes descending from these nodes in the before tree may also be marked as deleted.

Figure 7:
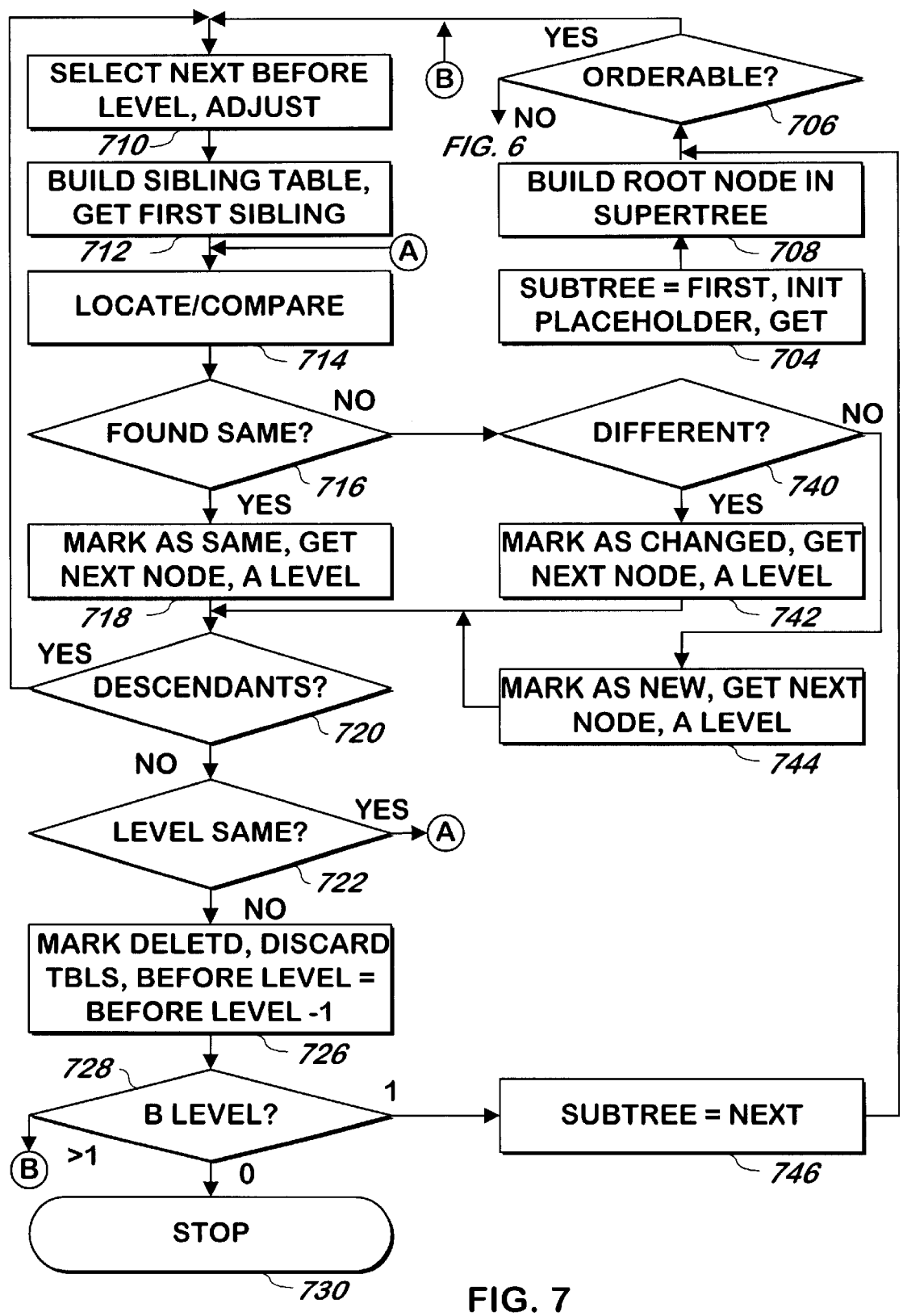
FIG. 7 is a flowchart illustrating a method of comparing the state of a computer before software is installed with the state of a computer after software is installed according to an alternate embodiment of the present invention

In one embodiment, if desired, step 606 may be omitted altogether: the after tree need not be built all at once, instead, it may be built as needed as described above. Referring now to FIG. 7, a method of comparing the state of a computer before software is installed with the state of a computer after software is installed is shown according to an alternate embodiment of the present invention.

One of the subtrees is selected as the first subtree, and a placeholder that keeps track of the current node in the subtree is initialized to point to the level one node of the subtree 704. The first level 2 node is retrieved as described below with respect to FIG. 8.

The root node in the supertree is built 708. If the subtree selected is orderable 706, the method continues at step 710. Otherwise, the method described above with respect to FIG. 6 is used for that subtree. A subtree is orderable if it is not the ini files subtree in one embodiment.

Two levels are tracked according to this method: a before level and an after level. The next before level is selected 710 using the same technique as described above with respect to step 610 of FIG. 6, and the before level is adjusted to match the level selected. The siblings table is built using the before tree 712 as described above with respect to step 612 of FIG. 6. A node corresponding to the node most recently retrieved is located in the table by matching names and if found, the other properties of the retrieved node are compared 714 with the located node. If the retrieved node is located and the properties match 716, a node is built in the supertree with these properties, at the same level and descended from the same parent as the retrieved node, and the next node is retrieved 718 from the supertree as described below. When a node is retrieved in step 718, the level of the node retrieved is received as described below. If the level of the new node is higher than the level of the last node retrieved 720, a placeholder in the supertree is updated to indicate the parent of the node retrieved. In addition, the old node is discarded. The level received in step 718 is stored as the after level 718. The method continues at step 720.

If the retrieved node is not located 716, or located but without identical properties 740, a node is inserted into the supertree at the same level and descending from the same parent as the retrieved node and the next node is retrieved 742 as described above with reference to FIG. 8. The level returned is stored as the after level 742. The method continues at step 720. If the node retrieved is not found and the names matched 716 and the other properties are not different 740, a node is built and marked as new 744 in the supertree at the same level and descending from the same parent as the node retrieved and the properties of the retrieved node are copied into the new node. In one embodiment, descendants of any added nodes are retrieved and added to the supertree and such nodes are marked as new, all as a part of step 744. The next node is retrieved and the level of that node stored as the after level as in step 742, and the method continues at step 720.

If the after level is higher than the before level, the node has descendants 720 and so the method continues at step 710. Otherwise, if the after level is the same as the before level 722, the method continues at step 714.

If the level is not the same 722, then it must be higher. In one embodiment, steps 718, 742 include marking the found row in the table as found. At step 726, the row not marked as found are built in the supertree at the same level and having the same parent as the not-found rows in the table, marked as deleted, and the properties of these rows are copied into the new nodes 726. This procedure may also be repeated for nodes in the before tree descending from deleted nodes. The table is discarded and the before level is decremented or otherwise adjusted to point to the level in the table as the after level 726.

The next step 728 depends on the before level. If the before level is zero, the method terminates 730 because all nodes of the before tree and what would have been the after tree have been built into the supertree. If the before level is 1, the subtree has been fully compared and the next subtree is selected 746 and the method continues at step 706. If the before level is greater than one, the method continues at step 710. The location technique in which the tables are sorted as described above may also be used with the methods described in FIGS. 6 or 7.

Figure 8:
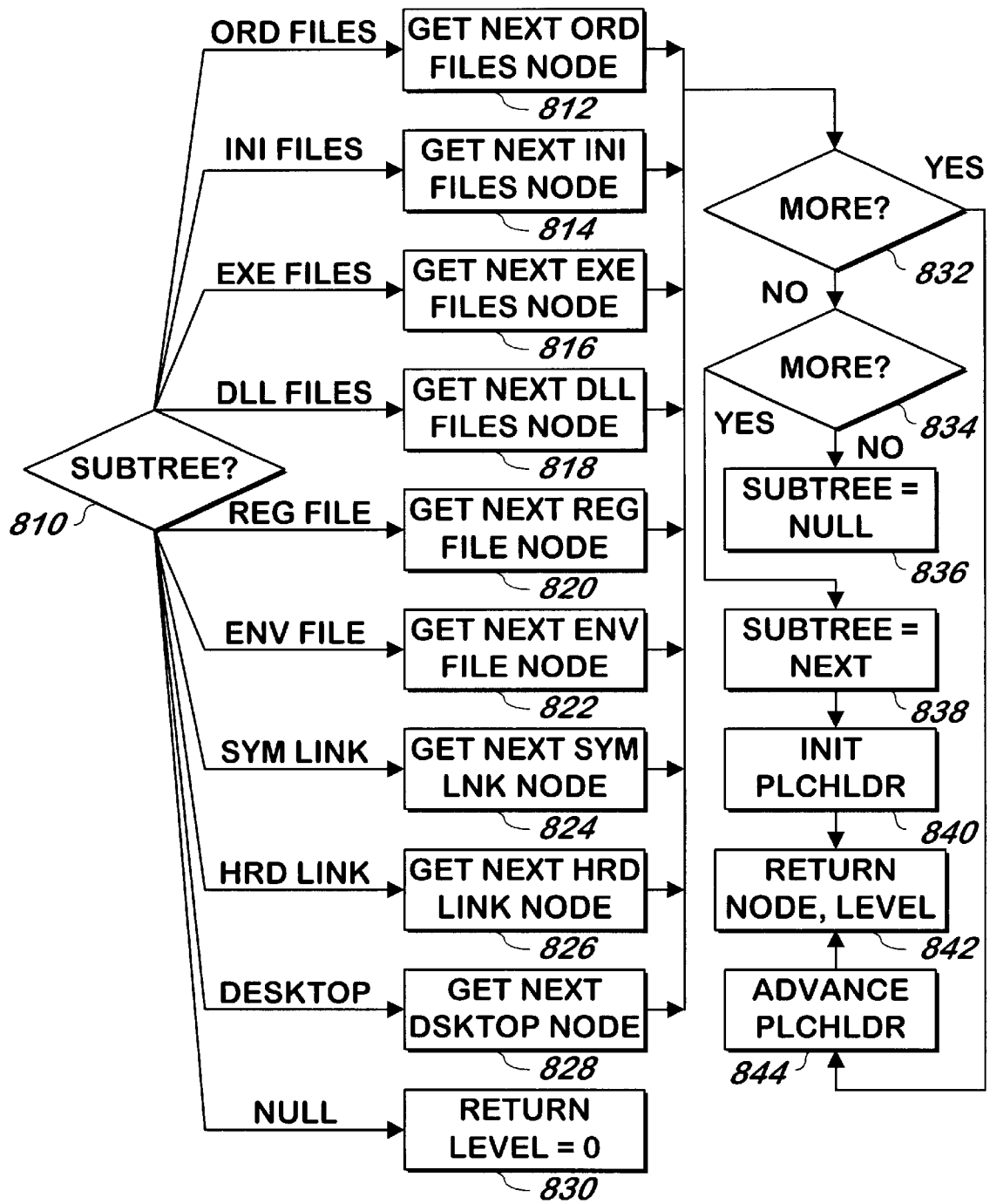
FIG. 8 is a flowchart illustrating a method of retrieving a sibling node according to one embodiment of the present invention.

Referring now to FIG. 8, a method of retrieving a sibling node is shown according to one embodiment of the present invention. The embodiment in which different types of files are placed in different subtrees is illustrated in the Figure. If nodes corresponding to files are all placed in the ordinary files subtree, the ordinary files subtree processed in step 812 replaces the processing of one or more of steps 814, 816, 818, 824 and 826 described below.

If the current subtree (initialized in step 704 of FIG. 9) is ordinary files 810, the next ordinary files node is retrieved 812 as described above. If the current subtree is ini files 810, the next ini files node is retrieved 814 as described above. If the current subtree is executable files 810, the next executable files node is retrieved 816 as described above. If the current subtree is dll files 810, the next dll files node is retrieved 818 as described above. If the current subtree is the registry file subtree 810, the next registry file node is retrieved 820 as described above. If the current subtree is the environment file 810, the next environment file node is retrieved 822 as described above. If the current subtree is symbolic links 810, the next symbolic link node is retrieved 824 as described above. If the current subtree is hard links 810, the next hard links node is retrieved 826 as described above. If the current subtree is the desktop 810, the next desktop node is retrieved 812 as described above. In some embodiments, any of the subtrees may be not orderable as described above, and if so, the steps 812–828 corresponding to these subtrees are omitted from the method. If the subtree is null, a zero or "−1" level is returned 830.

After any of steps 812–828, the method continues at step 832. If there are more nodes in the current subtree 832, a placeholder is advanced 844 to the next node and the node retrieved in the most recent step 812–828 is returned 842 along with the level that node 842.

In step 842, the placeholder is advanced to any next ordered child node of the node retrieved in step 812–828. If no such child node exists, the placeholder is advanced to the next ordered sibling node. If no such sibling node exists, the placeholder is set to the next antecedent node containing a sibling that has not been returned before.

If no more nodes exist in the current subtree 832, if there are more subtrees 834, the current subtree is changed to the next subtree 838, the placeholder is initialized 840 to the level 1 node of the subtree and the method continues at step 842. If there are no more subtrees 834, the current subtree is set to null 836.

As described above with respect to step 316 of FIG. 3, after the supertree is built it is processed further in one embodiment of the present invention. Referring now to FIGS. 9A and 9B, a method of post processing a supertree is shown according to one embodiment of the present invention.

Aliases are identified as described above, and the first node in the supertree is selected 910. The selected node is read 912. If the node is marked as deleted 914, the node is marked as the same 916 and the method continues at step 922. If the node was not marked as deleted 914 but was marked as changed 918, the node is altered to be marked as added 920 and the method continues at step 922.

If the operating system is the conventional Windows operating system 922, if the node corresponds to a DLL file the name of the node is used to locate 923 the reference count of the file in the Windows registry. If the reference counts (from the node and from the registry) do not match 924, the node corresponding to the .dll is marked as added and the method continues at step 932.

If the operating system is not windows 922, the reference count for the selected node in the hard link subtree is located 927 as described above. If nodes corresponding to files containing links are placed in a single ordinary files subtree, that subtree is used in place of the hard link subtree. If the reference count is greater than one 928, the inode number corresponding to the file is stored 930 in a table along with the inode number as described above and the method continues at step 932. If no reference count exists or the reference count is less than or equal to "1", the method continues at step 932.

If some or all of the property of the node matches a property corresponding to an alias 932, the alias is substituted in place of portion of the property corresponding to the alias 934, and the method continues at step 936. If there is no such match 932, the method continues at step 936.

If there are more nodes in the supertree 936, the next node is selected 938 as described above and the method continues at step 912. If there are no more nodes in the supertree, the method continues at step 950 of FIG. 9B.

If the operating system is not the UNIX operating system or a variant thereof 950, the method terminates at step 962. Otherwise, the method continues at step 952.

The first node of the subtree initially containing the hard links (either hard links or the ordinary files) is selected 952 as described above. The file corresponding to the node is investigated, or the property corresponding to the reference count is investigated if it was added to the node as described above, to determine if the file corresponding to the node has a reference count greater than one and if so, and if it is the first file to refer to it, the method continues at step 958. If the file refers to an inode and is not the first, the node corresponding to the file is adjusted to look as though the node is a hard link 956 and the method continues at step 958. The adjustment may be made my changing a property of the node or by placing moving the links to the node to the hard link subtree of the supertree.

If there are more nodes in the supertree 958, the method continues at step 954, otherwise the method continues at step 962. The first node in the tree as modified above is selected 962 and if the selected node is marked "same", the node is removed from the tree 966, otherwise, the method continues at step 968. If there are more nodes in the tree 968, the next node is selected 970 and the method continues at step 962. Otherwise, the method terminates 972.

Figure 9A:
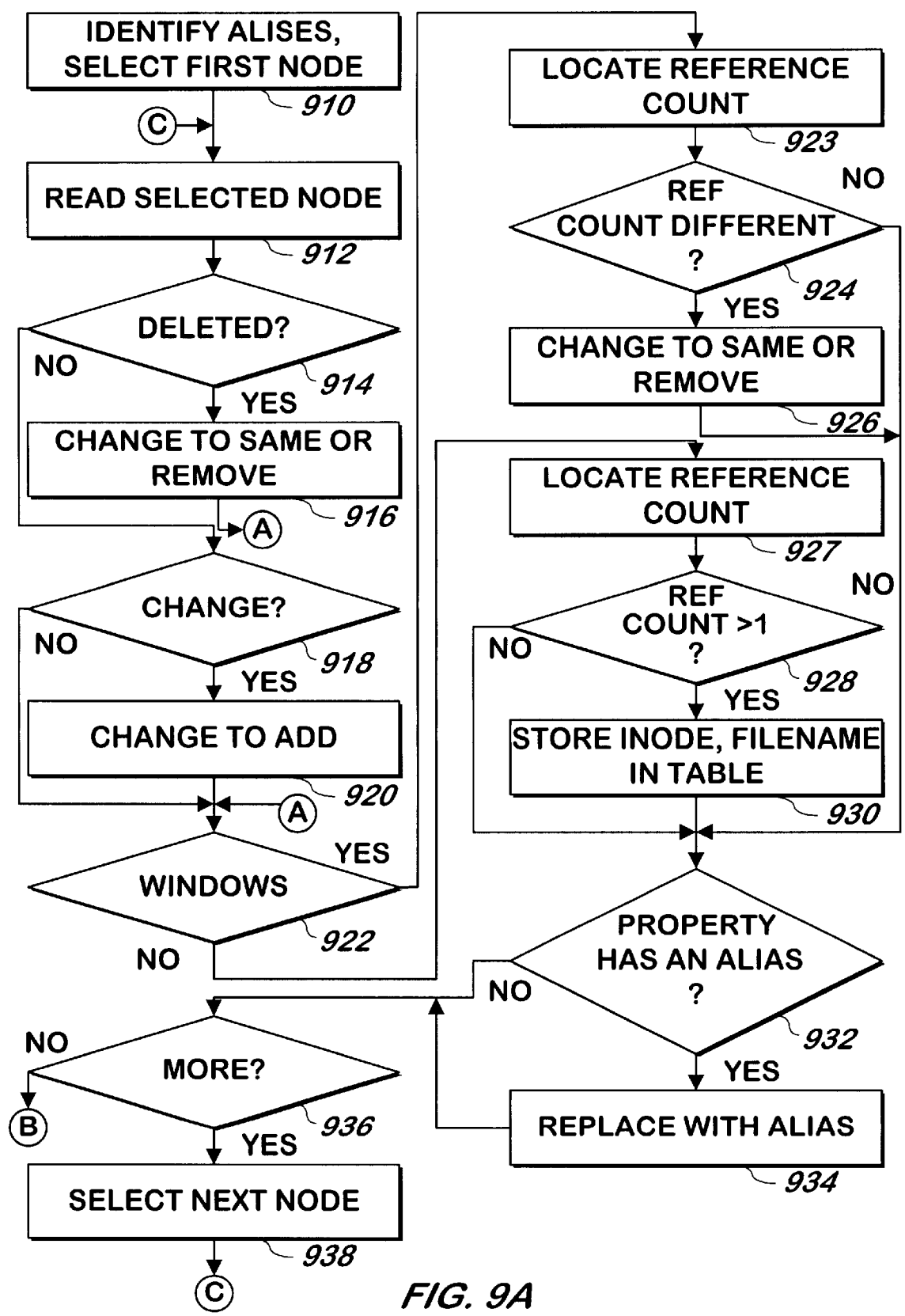
FIGS. 9A and 9B are flowcharts illustrating a method of post processing according to one embodiment of the present invention.
Figure 9B:
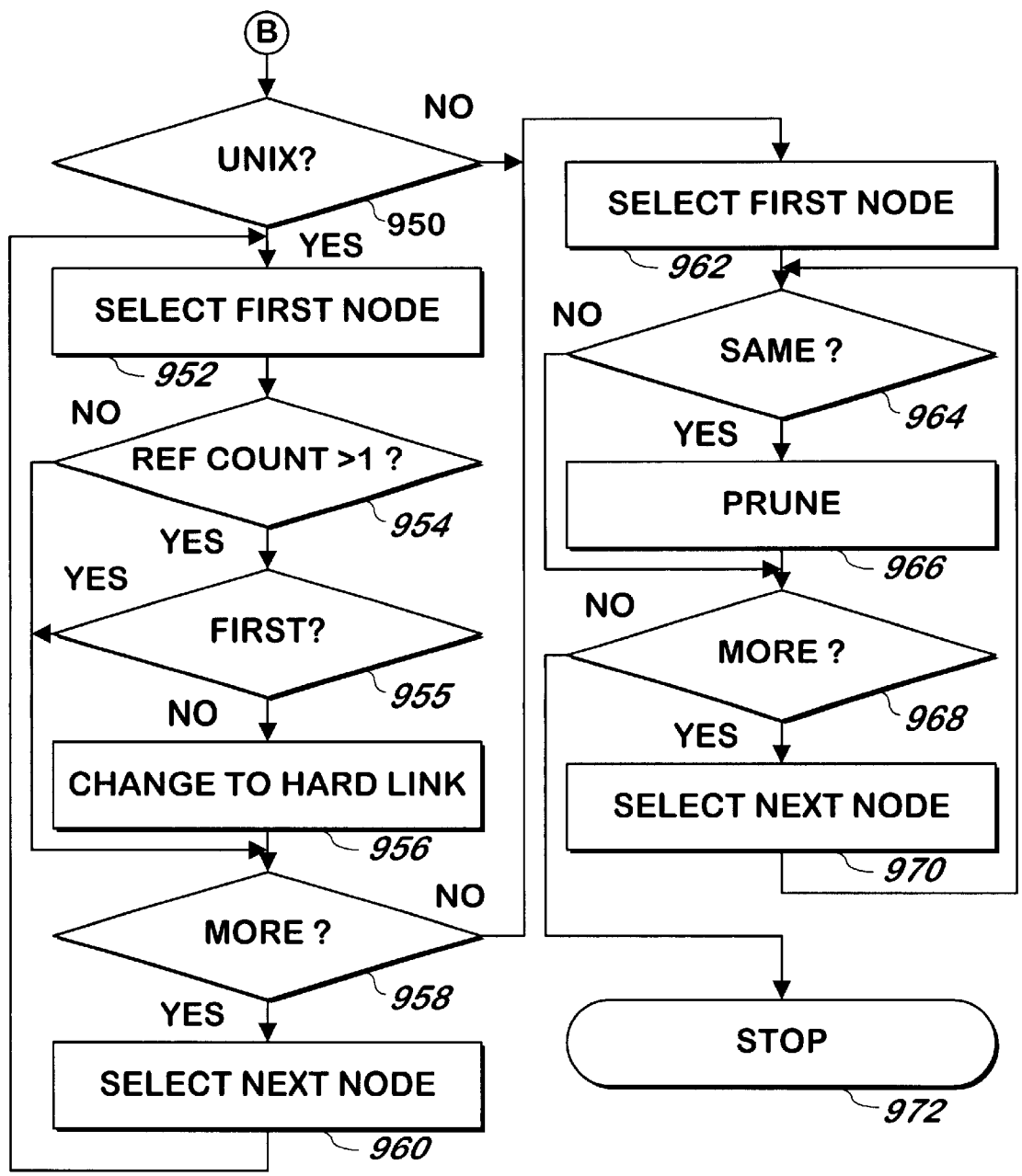

In another embodiment, steps 962–970 are performed before some or all of the other steps in FIGS. 9A and 9B. In such embodiments, reference counts are checked in step 954 using the reference count in the before tree and the reference count obtained for the file itself (for example, using the operating system) and if an node corresponding to the file is not in the supertree, it is inserted into it at step 956 and marked as "added". This step may be performed by hard link post processor 953 in FIG. 2.

Figure 10:
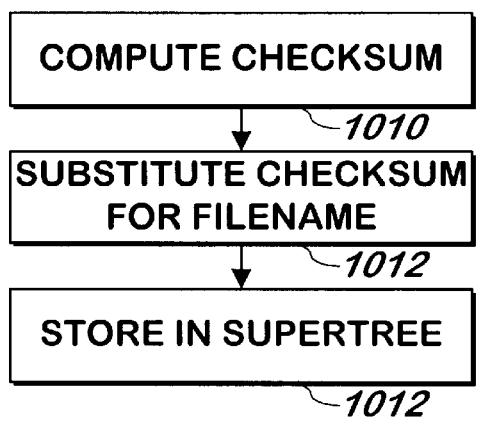
FIG. 10 is a flowchart illustrating a method of assembling a manifest according to one embodiment of the present invention.

Referring again to FIG. 3, the manifest, files and program are assembled 318 as described above. In one embodiment, the manifest is assembled as shown in FIG. 10. The checksum for the file is computed 1010 using either the name and path of the file, the contents of the file or both. The file is renamed 1012 using the operating system. The new name is one of the checksums or one of the checksums and one or more other attributes of the file, such as the date, size, name or any or all of these. The checksum is stored 1014 with the filename in the supertree to allow the filename to be restored when the files are installed on the other computer.

What is claimed is:

1. A method of identifying changes made to a computer system resulting from installation of software, the method comprising:

for each of a first plurality of objects, and responsive to a type of at least one of the objects in the first plurality, recording at least one first state of the computer system prior to installation of the software to a registry of an operating system;

for each of second plurality of objects, and responsive to a type of at least one of the objects in the second plurality, recording at least one second state of the computer system, at least some of the objects in the first plurality corresponding to at least some of the objects in the second plurality, after the installation of the software;

comparing the at least one second state with the at least one first state; and producing a record of the changes responsive to the comparing step.

2. The method of claim 1, wherein at least some of the objects comprise files and the recording the at least one first state step comprises:

allocating a plurality of the files on the computer system into a plurality of sets of the files; and building at least one hierarchical structure for each of the sets of files allocated, each of the at least one hierarchical structure corresponding to a storage structure of the files in each set.

3. The method of claim 1 wherein the recording at least one second state and the comparing steps comprise:

recording a second state of a first object in the second plurality selected from a file and a link;

comparing the second state recorded with at least one the first state recorded;

discarding the second state; and recording a second state of a second object in the second plurality after discarding step.

4. The method of claim 1 wherein the producing step comprises indicating an object in the second plurality and absent from the first plurality is added to the computer system.

5. The method of claim 1 wherein:

the comparing step comprises comparing at least one property of a first object in the first plurality with at least one property of a second object in the second plurality and corresponding to the first object; and the producing step comprises indicating at least one selected from the first object and the second object is changed.

6. The method of claim 1 wherein the producing step comprises:

building an interim record of changes;

identifying at least one location specified in the interim record; and building the record by substituting an alias of the at least one location in place of the at least one location.

7. The method of claim 1, additionally comprising providing the record to a different computer system.

8. The method of claim 7, wherein at least a plurality of the objects in the second plurality comprise files, the method additionally comprising providing at least one file corresponding to at least one of the file objects in the second plurality.

9. The method of claim 8 comprising the additional step of renaming at least one of the files provided.

10. The method of claim 9 wherein the renaming at least one of files step comprises computing a checksum.

11. A computer program product comprising a computer useable medium having computer readable program code embodied therein for identifying changes made to a computer system resulting from installation of software, the computer program product comprising:

computer readable program code devices configured to cause a computer to, for each of a first plurality of objects, record at least one first state of the computer system prior to installation of the software;

computer readable program code devices configured to cause a computer to, for each of second plurality of objects, record at least one second state of the computer system, at least some of the objects in the first plurality corresponding to at least some of the objects in the second plurality, after the installation of the software;

computer readable program code devices configured to cause a computer to compare the at least one second state with the at least one first state; and computer readable program code devices configured to cause a computer to produce a record of the changes responsive to the computer readable program code devices configured to cause a computer to compare.

12. The computer program product of claim 11, wherein at least some of the objects comprise files and the computer readable program code devices configured to cause a computer to record the at least one first state step comprises:

computer readable program code devices configured to cause a computer to allocate a plurality of the files on the computer system into a plurality of sets of the files; and computer readable program code devices configured to cause a computer to build at least one hierarchical structure for each of the sets of files allocated, each of the at least one hierarchical structure corresponding to a storage structure of the files in each set.

13. The computer program product of claim 11 wherein the computer readable program code devices configured to cause a computer to record at least one second state and the computer readable program code devices configured to cause a computer to compare comprise:

computer readable program code devices configured to cause a computer to record a second state of a first object in the second plurality selected from a file and a link;

computer readable program code devices configured to cause a computer to compare the second state recorded with at least one the first state recorded;

computer readable program code devices configured to cause a computer to discard the second state; and computer readable program code devices configured to cause a computer to record a second state of a second object in the second plurality after discarding step.

14. The computer program product of claim 11 wherein the computer readable program code devices configured to cause a computer to produce comprise computer readable program code devices configured to cause a computer to indicate an object in the second plurality and absent from the first plurality is added to the computer system.

15. The computer program product of claim 11 wherein:
the computer readable program code devices configured to cause a computer to compare comprise computer readable program code devices configured to cause a computer to compare at least one property of a first object in the first plurality with at least one property of a second object in the second plurality and corresponding to the first object; and
the computer readable program code devices configured to cause a computer to produce comprise computer readable program code devices configured to cause a computer to indicate at least one selected from the first object and the second object is changed.

16. The computer program product of claim 11 wherein the computer readable program code devices configured to cause a computer to produce comprise:
computer readable program code devices configured to cause a computer to build an interim record of changes;
computer readable program code devices configured to cause a computer to identify at least one location specified in the interim record; and
computer readable program code devices configured to cause a computer to build the record by substituting an alias of the at least one location in place of the at least one location.

17. The computer program product of claim 11, additionally comprising computer readable program code devices configured to cause a computer to provide the record to a different computer system.

18. The computer program product of claim 17, wherein at least a plurality of the objects in the second plurality comprise files, the computer program product additionally comprising computer readable program code devices configured to cause a computer to provide at least one file corresponding to at least one of the file objects in the second plurality.

19. The computer program product of claim 18 additionally comprising computer readable program code devices configured to cause a computer to rename at least one of the files provided.

20. The computer program product of claim 19 wherein the computer readable program code devices configured to cause a computer to rename at least one of files comprise computer readable program code devices configured to cause a computer to compute a checksum.

21. An apparatus for identifying changes made to a computer system due to an installation of software, the apparatus comprising:
a space state retriever having a first input operatively coupled to receive at least one property of at least one file, the space state retriever for providing at a first output a first set of property information responsive to the at least one property received at the first input and not after the installation of the software;
a before tree storage having an input/output coupled to the space state retriever first output for storing the set of property information; and
a difference calculator having a first input coupled to the before tree storage input/output for receiving the set of property information, a second input operatively coupled to receive at least one property corresponding to a state of the computer system after the installation of the software, the difference calculator for comparing the first set with the at least one property and providing at an output coupled to an apparatus output a second set of property information responsive to the comparison, the second set comprising at least one indication indicating one selected from deletion and addition.

22. The apparatus of claim 21, wherein the first set of property information comprises a plurality of groups of information, at least one of the groups comprising a name characteristic of a file and at least one additional characteristic of the file.

23. The apparatus of claim 21 wherein the first set of information comprises a tree, the tree comprising a plurality of subtrees, each subtree corresponding to at least one type of the at least one file.

24. The apparatus of claim 21, additionally comprising a post processor for adjusting the second set of property information.

25. The apparatus of claim 21 additionally comprising a file retriever having a first input coupled to the difference calculator output for receiving a third set of property information corresponding to the second set of property information and a second input for receiving at least one of the at least one file, the file retriever for retrieving and providing at an output at least one of the at least one file responsive to the third set of property information.

26. The apparatus of claim 25:
wherein the file retriever additionally provides at a checksum output the at least one file retrieved;
the apparatus additionally comprising a checksum calculator having an input coupled to the file retriever checksum output to receive the at least one of the at least one file, the checksum calculator for computing and providing at an output a checksum of the at least one of the at least one file received at the checksum input; and
the at least one of the at least one file provided at the file retriever output is stored responsive to the checksum provided at the checksum calculator output.

* * * * *